(12) United States Patent
Yoon

(10) Patent No.: US 10,946,742 B2
(45) Date of Patent: Mar. 16, 2021

(54) VEHICLE SPEED CALCULATING METHOD AND DEVICE AND DRIVER STATE MONITORING SYSTEM INCLUDING VEHICLE SPEED CALCULATING DEVICE

(71) Applicant: MTEKVISION CO., LTD., Gyeonggi-do (KR)

(72) Inventor: Han Noh Yoon, Seoul (KR)

(73) Assignee: MTEKVISION CO., LTD., Seongnam-si (KR)

( * ) Notice: Subject to any disclaimer, the term of this patent is extended or adjusted under 35 U.S.C. 154(b) by 122 days.

(21) Appl. No.: 16/098,754

(22) PCT Filed: Aug. 18, 2016

(86) PCT No.: PCT/KR2016/009094
§ 371 (c)(1),
(2) Date: Nov. 2, 2018

(87) PCT Pub. No.: WO2018/034365
PCT Pub. Date: Feb. 22, 2018

(65) Prior Publication Data
US 2019/0160944 A1    May 30, 2019

(30) Foreign Application Priority Data
Aug. 16, 2016  (KR) .......................... 10-2016-0103416

(51) Int. Cl.
*B60K 28/02*  (2006.01)
*B60W 40/105* (2012.01)
(Continued)

(52) U.S. Cl.
CPC .............. *B60K 28/02* (2013.01); *B60K 28/10* (2013.01); *B60W 40/08* (2013.01);
(Continued)

(58) Field of Classification Search
CPC ....... B60K 28/02; B60K 28/10; B60W 40/08; B60W 40/105; B60W 2520/10; G01S 19/52; G06F 13/20
See application file for complete search history.

(56) References Cited

FOREIGN PATENT DOCUMENTS

| CN | 202229766 | 5/2012 |
|----|-----------|--------|
| JP | 11218425 | 8/1999 |

(Continued)

*Primary Examiner* — Dao L Phan
(74) *Attorney, Agent, or Firm* — LRK Patent Law Firm

(57) ABSTRACT

Vehicle speed calculating device and method and a driver state monitoring system including the vehicle speed calculating device are provided. The vehicle speed calculating device includes: a signal determining unit configured to receive raw data input from a raw data generating device connected to an input socket via a UART port and a GPIO port, to perform a validation test on two types of raw data received via the UART port and the GPIO port, to determine one type of raw data as valid raw data, and to output the valid raw data and signal type information generated to correspond to the valid raw data; and a vehicle speed calculating unit configured to receive the valid raw data and the signal type information and to generate vehicle speed information corresponding to a vehicle speed which is calculated by processing the valid raw data using a predetermined processing method to match the signal type information.

12 Claims, 3 Drawing Sheets

(51) Int. Cl.
   *B60W 40/08*    (2012.01)
   *B60K 28/10*    (2006.01)
   *G01S 19/52*    (2010.01)
   *G06F 13/20*    (2006.01)

(52) U.S. Cl.
   CPC ........... *B60W 40/105* (2013.01); *G01S 19/52* (2013.01); *G06F 13/20* (2013.01); *B60W 2520/10* (2013.01); *B60W 2540/22* (2013.01)

(56) References Cited

FOREIGN PATENT DOCUMENTS

| | | |
|---|---|---|
| JP | 2006300783 | 11/2006 |
| JP | 5391717 | 1/2014 |
| JP | 2014113904 | 6/2014 |
| KR | 1019990055652 | 7/1999 |
| KR | 100412691 | 12/2003 |
| KR | 1020060120733 | 11/2006 |
| KR | 1020090036924 | 4/2009 |
| KR | 1020130133549 | 12/2013 |

VEHICLE SPEED CALCULATING METHOD AND DEVICE AND DRIVER STATE MONITORING SYSTEM INCLUDING VEHICLE SPEED CALCULATING DEVICE

This application is a national stage application of PCT/KR2016/009094 filed on Aug. 18, 2016, which claims priority of Korean patent application number 10-2016-0103416 filed on Aug. 16, 2016. The disclosure of each of the foregoing applications is incorporated herein by reference in its entirety.

TECHNICAL FIELD

The invention relates to vehicle speed calculating method and device and a driver state monitoring system including the vehicle speed calculating device.

BACKGROUND ART

As disclosed in Korean Patent No. 10-0412691 or the like, various driver state monitoring devices that detect whether a driver of a vehicle is driving while drowsy using image processing techniques, speech recognition techniques, and the like, call the driver's attention by outputting warning sound or the like, and enable the driver to actively cope with an emergency have been developed recently.

However, the function of warning a driver about drowsiness and carelessness, which is included in such a driver state monitoring device, is significant when the vehicle is traveling, but may hinder the driver's intentional action to cause a problem when the vehicle is stopping.

Accordingly, it is necessary to determine whether a vehicle is traveling or stopping and to appropriately perform the warning function about drowsiness and carelessness, but the driver state monitoring device according to the related art has a problem in that the warning function is performed regardless of whether the vehicle is traveling.

For example, vehicle speed information can be used to determine whether a vehicle is traveling or stopping. Raw data which is used to calculate vehicle speed information can be acquired, for example, via an onboard diagnostics (OBD) terminal, be supplied from a GPS module mounted in the vehicle, or be acquired a vehicle speed sensor such as a Hall sensor mounted in a transmission of the vehicle.

That is, when raw data is acquired via the OBD terminal, the vehicle speed calculating device analyzes the acquired raw data and calculates vehicle speed information by executing a pre-installed program. At this time, the vehicle speed calculating device has to include a CAN interface.

The vehicle speed calculating device may be supplied with raw data from a UPS module in a universal asynchronous receiver/transmitter (UART) communication system and calculate the vehicle speed information.

The vehicle speed calculating device may acquire raw data from a vehicle speed sensor via a general-purpose input/output (GPIO) port and calculate vehicle speed information.

However, a vehicle speed calculating device according to the related art is not embodied as a general-purpose device that receives and processes various types of raw data which are supplied from various raw data generating devices (for example, a GPS module and a vehicle speed sensor) for the purpose of calculating a vehicle speed, but is manufactured and sold to definitely match only one type of raw data generating device.

Accordingly, difficulty is caused in production of goods, inventory, and distribution management, and there is also a problem in that the vehicle speed calculating device also has to be replaced when a raw data generating device mounted in a vehicle is replaced.

SUMMARY OF INVENTION

Technical Problem

The invention provides vehicle speed calculating method and device that can allow unlimited use of various types of raw data (for example, a GPS signal in an NMEA standard or a rectangular pulse signal front a vehicle speed sensor) to calculate a vehicle speed by realizing a universal vehicle speed calculating device which can be connected to various types of raw data generating devices and that can automatically determine which type of raw data is input from a raw data generating device connected to the vehicle speed calculating device and process the input raw data and a driver state monitoring system including the vehicle speed calculating device.

The invention provides vehicle speed calculating method and device that can continuously use the same vehicle speed calculating device regardless of replacement of a raw data generating device by realizing a universal vehicle speed calculating device and that can achieve convenience in production of goods, inventory, and distribution management and a driver state monitoring system including the vehicle speed calculating device.

The invention provides vehicle speed calculating method and device that can provide vehicle speed information calculated by a vehicle speed calculating device to various electronic devices in a vehicle in a wireless or wired manner for the purpose of use of the vehicle speed information corresponding to a designated objective and a driver state monitoring system including the vehicle speed calculating device.

Other objectives of the invention will be easily understood from the following description.

Solution to Problem

According to an aspect of the invention, there is provided a vehicle speed calculating device including: a signal determining unit configured to receive raw data input from a raw data generating device connected to an input socket via a UART port and a GPIO port, to perform a validation test on two types of raw data received via the UART port and the GPIO port, to determine one type of raw data as valid raw data, and to output the valid raw data and signal type information generated to correspond to the valid raw data; and a vehicle speed calculating unit configured to receive the valid raw data and the signal type information and to generate vehicle speed information corresponding to a vehicle speed which is calculated by processing the valid raw data using a predetermined processing method to match the signal type information.

The raw data generating device may be a positioning unit that outputs a GPS signal as raw data or a vehicle speed sensor that outputs a rectangular pulse signal as raw data.

The signal determining unit may perform a validation test of checking checksum in accordance with an NMEA standard on the raw data input via the UART port and may perform a validation test of measuring a difference between a pulse interval and a neighboring pulse interval for a predetermined time on the raw data input via the GPIO port.

The signal determining unit may skip outputting of the signal type information and the valid raw data when it is determined that all the types of raw data input through the validation test on the raw data input via the UART port and the GPIO port are valid signals.

The signal determining unit may perform the validation test on the two types of raw data only when a predetermined conditions has been satisfied, and the predetermined condition may include one or more of a condition that it is detected that the raw data generating device is disconnected from the input socket and then is connected again thereto and a condition that a vehicle is switched from an ignition-off state to an ignition-on state.

The vehicle speed calculating device may further include a delivery unit configured to supply the valid raw data to another electronic device, the delivery unit may include: a UART port that outputs the valid raw data to another electronic device; and an NMEA encoder that encodes the valid raw data in a GPS signal standard and the encoded valid raw data to the UART port when the raw data received via the GPIO port is determined to be valid raw data.

According to another aspect of the invention, there is provided a driver state monitoring system including the vehicle speed calculating device.

Other aspects, features, and advantages of the invention will become apparent from the accompanying drawings, the appended claims, and the detailed description of the invention.

Advantageous Effects of Invention

According to an embodiment of the invention, it is possible to allow unlimited use of various types of raw data (for example, a GPS signal in an NMEA standard or a rectangular pulse signal from a vehicle speed sensor) to calculate a vehicle speed by realizing a universal vehicle speed calculating device which can be connected to various types of raw data generating devices.

It is also possible to automatically determine which type of raw data is input from a raw data generating device connected to the vehicle speed calculating device and to process the input raw data.

It is also possible to continuously use the same vehicle speed calculating device regardless of replacement of a raw data generating device by realizing a universal vehicle speed calculating device and to achieve convenience in production of goods, inventory, and distribution management.

It is possible to provide vehicle speed information calculated by a vehicle speed calculating device to various electronic devices in a vehicle in a wireless or wired manner for the purpose of use of the vehicle speed information corresponding to a designated objective.

DESCRIPTION OF EMBODIMENTS

Figure 1:
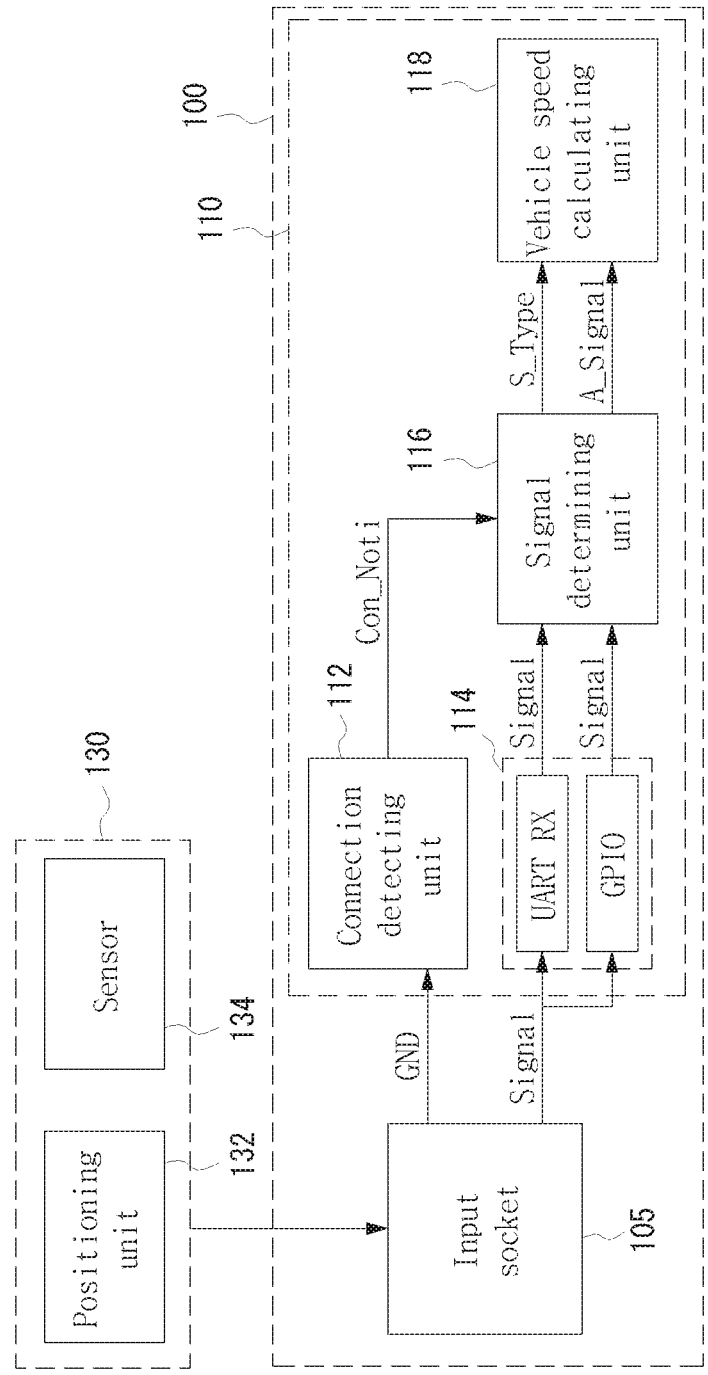
FIG. 1 is a diagram illustrating a configuration of a vehicle speed calculating device according to an embodiment of the invention.

The invention can be modified in various forms and specific embodiments will be described below and illustrated. However, the embodiments are not intended to limit the invention, but it should be understood that the invention includes all modifications, equivalents, and replacements belonging to the concept and the technical scope of the invention. When it is determined that detailed description of known techniques involved in the invention makes the gist of the invention obscure, the detailed description thereof will not be made.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. When it is determined that detailed description of known techniques involved in the invention makes the gist of the invention obscure, the detailed description thereof will not be made.

FIG. 1 is a diagram illustrating a configuration of a vehicle speed calculating device according to an embodiment of the invention.

Referring to FIG. 1, a vehicle speed calculating device 100 includes an input socket 105 and a main processing unit 110.

The input socket 105 is coupled to a raw data output plug of a raw data generating device 130 to receive raw data.

The input socket 105 is formed, for example, in a shape like an earphone connector socket, and is coupled to a raw data output plug of one (hereinafter referred to as a raw data generating device 130) of a positioning unit 132 including a GPS module and a sensor 134 such as a Hall sensor as a vehicle speed sensor. By coupling the raw data output plug to the input socket 105, ground (GND) terminals thereof are connected to each other.

By coupling to the raw data output plug, the input socket 105 is configured to receive raw data input from the raw data generating device 130 selectively via a universal asynchronous receiver/transmitter (UART) port and a general-purpose input/output (GPIO) port of a signal input unit 114.

The main processing unit 110 includes a connection detecting unit 112, a signal input unit 114, a signal determining unit 116, and a vehicle speed calculating unit 118.

The connection detecting unit 112 detects whether the raw data output plug is coupled to the input socket 105 in a state in which the input socket 105 and the GND terminal are connected based on a GPIO voltage level of the GPIO port, and supplies a connection notification Con_Noti to the signal determining unit 116 when both are coupled.

For example, when the raw data output plug is coupled to the input socket 105 and ground terminals thereof are connected, the GPIO voltage level of the connection detecting unit 112 changes from a high level to a GND voltage level and thus the connection detecting unit 112 can that the raw data output plug is coupled to the input socket 105.

However, when the GPIO voltage level of the connection detecting unit 112 is kept at a high level the GND line is open and thus the connection detecting unit 112 can ascertain that the raw data output plug is not coupled to the input socket 105. In this case, the connection detecting unit 112 may transmit a disconnection notification to the signal determining unit 116.

The signal input unit 114 includes a UART port and a GPIO port, and receives raw data input from the raw data generating device 130 via the UART port and the GPIO port from the input socket 105.

The signal input unit 114 transmits raw data input via the UART port, and the GPIO port to the signal determining unit 116 in order to determine which raw data out of the raw data input via the UART port and the GPIO port is valid raw data and to use the raw data.

As described above, one of the positioning unit 132 that outputs a GPS signal which is to be input and output via the UART port and the sensor 134 that outputs a rectangular pulse signal which is to be input and output via the GPIO port is coupled as the raw data generating device 130 to the input socket 105.

However, since which raw data generating device 130 is coupled to the input socket 105 is determined by the signal determining unit 116 which will be described later, input raw data is processed to be input and output via the UART port and the GPIO port n a section from the input socket 105 to the signal determining unit 116. Thereafter, the signal determining unit 116 determines one of the positioning unit 132 and the sensor 134 as the raw data generating device 130 and then delivers only valid raw data to the vehicle speed calculating unit 118 for the purpose of calculation of a vehicle speed.

According to this configuration, even when the raw data generating device 130 is replaced with one of the positioning unit 132 and the sensor 134 while the other of the positioning unit 132 and the sensor 134 is being coupled as the raw data generating device 130 to the input socket 105 and is being used, the vehicle speed calculating device 100 according to this embodiment can be continuously used without being replaced.

When a connection notification Con_Noti is input from the connection detecting unit 112 having detected that a raw data output plug is coupled to the input socket 105 and raw data is input from the UART port and the GPIO port of the signal input unit 114, the signal determining unit 116 determines whether which type of raw data of the two types of raw data is valid raw data.

The signal determining unit 116 can determine whether the raw data input via the UART port is valid raw data, for example, by checking checksum in accordance with a national marine electronics association (NMEA) standard.

Accordingly, when the raw data generating device 130 connected to the input socket 105 is the positioning unit 132 and the input raw data is a GPS signal, the signal determining unit 116 determines that the raw data input via the UART port is valid raw data.

Similarly, the signal determining unit 116 determines whether the raw data input via the GPIO port is valid raw data, for example, by measuring a difference between a pulse interval (that is, information proportional to a speed) and a neighboring pulse interval (that is, information proportional to acceleration) for a predetermined time.

When the raw data generating device 130 connected to the input socket 105 is the positioning unit 132 and the input raw data is a GPS signal, the GPS signal input via the GPIO port generally has a much higher frequency than that of a rectangular pulse signal output from the sensor 134 even at a slowest baud rate, is thus measured to be at an abnormally high speed, and is determined to be invalid raw data.

The signal determining unit 116 performs a validation test on two types of raw data which are input via the UART port and the GPIO port and can determine whether the raw data generating device 130 connected to the input socket 105 is the positioning unit 132 or the sensor 134 and whether the type of the raw data is a GPS signal or a rectangular pulse signal depending the path (that is, the UART port or the GPIO port) via which the raw data determined to be valid raw data has been input.

Here, the order in which the signal determining unit 116 has to first perform a validation test on which raw data from two types of raw data input via the UART port and the GPIO port is not limited and can be set to be various if necessary.

In this case, when one type of raw data which has been earlier determined from the input two types of raw data is determined to be invalid, the signal determining unit 116 may reduce a process time for determination of valid raw data by skipping an additional validation test and determining that the other type of raw data which has not been yet subjected to the validation test is valid raw data.

When all the two types of rave data input via different paths are determined to be invalid signals as the result of the validation test performed on the two types of raw data, the signal determining unit 116 may determine that the input two types of raw data are determined to be invalid signals. When all the two types of raw data are determined to be invalid signals, the signal determining unit 116 may prohibit transmission of the raw data to the vehicle speed calculating unit 118.

When one type of raw data is determined to be valid raw data by the validation test, the signal determining unit 116 inputs the valid raw data A_Signal and signal type information S_Type corresponding to the valid raw data to the vehicle speed calculating unit 118.

The signal type information may include, for example, one or more of information on whether the raw data generating device 130 is the positioning unit 132 or the sensor 134 and information on whether the type of the raw data is a GPS signal or a rectangular pulse signal or may be information which is designated in advance to correspond thereto.

Valid raw data is one type of raw data which is determined to be valid from two types of raw data input via the UART port and the GPIO port, and can be input to the vehicle speed calculating unit 118 through a bypassing process by the signal determining unit 116.

The signal determining unit 116 does not perform an operation of determining valid raw data whenever two types of raw data are input from the signal input unit 114, but may perform a process of generating signal type information for a predetermined unit time only when a predetermined condition is satisfied and may perform a process of inputting the raw data corresponding to the signal type information to the vehicle speed calculating unit 118 through a bypass process until the predetermined condition is satisfied again.

Here, examples of the predetermined condition include a condition that a connection notification is input gain from the connection detecting unit 112 after a disconnection notification has been input and a condition that the vehicle is switched from an ignition-off state to an ignition-on state. The predetermined unit time can be set in advance to a time required for completing a validation test on one or more of two types of input raw data and generating signal type information.

When the signal type information and the valid raw data are input from the signal determining unit 116, the vehicle speed calculating unit 118 generates vehicle speed information corresponding to a vehicle speed which is calculated by processing the input valid raw data to match the input signal type information. The procedure of receiving a GPS signal or a rectangular pulse signal and calculating and generating vehicle speed information is obvious to those skilled in the art and thus description thereof will be omitted.

Figure 2:
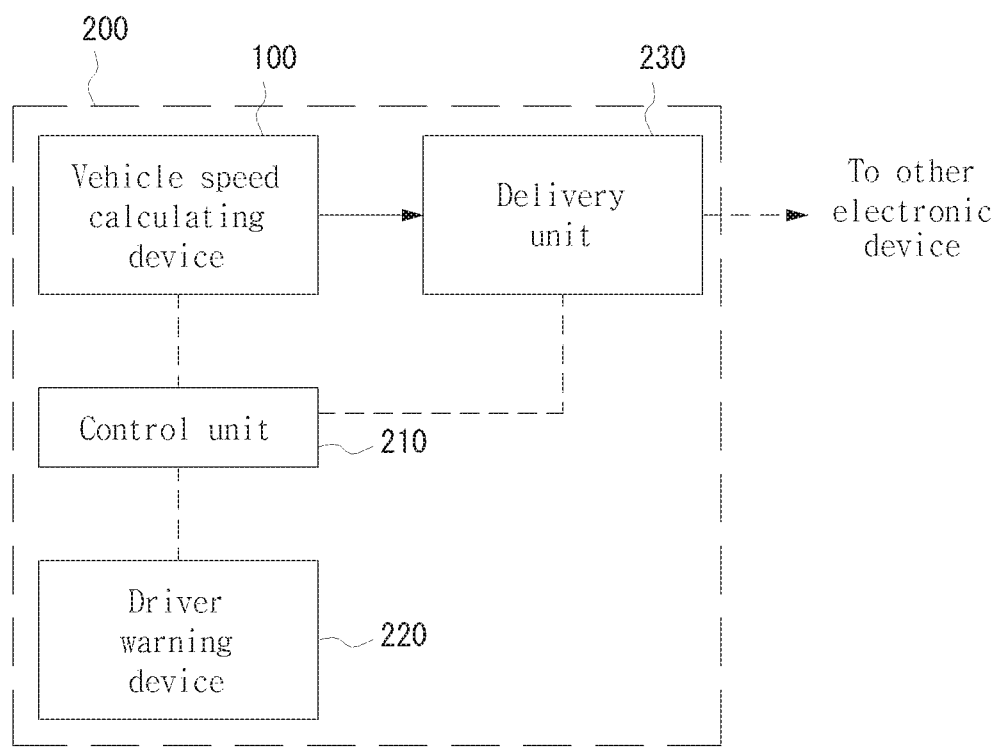
FIG. 2 is a diagram illustrating a configuration of a driver state monitoring system including the vehicle speed calculating device according to the embodiment of the invention.

FIG. 2 is a diagram illustrating the configuration of a driver state monitoring system including the vehicle speed calculating device according to the embodiment of the invention.

Referring to FIG. 2, the vehicle speed calculating device 100 can be included as a constituent element of a driver state monitoring system 200, and the driver state monitoring system 200 can further include a control unit 210 and a driver warning device 220.

The driver warning device 220 determines whether a driver is driving while drowsy. When it is determined that the driver is driving while drowsy, the driver warning device 220 calls the driver's attention by outputting sound, vibration, or the like. The driver warning device 220 can determine whether the driver is driving while drowsy, for example, by capturing a face image of the driver and detecting a pupil area of the driver from the captured image.

The control unit 210 can control the driver warning device 220 such that the driver warning device 220 operates as described above only when the vehicle speed calculating device 100 determines that the vehicle is traveling, thereby preventing a problem which is caused by hindering the driver's intentional action such as the driver's drowsiness in a state in which the vehicle is stopping.

The driver state monitoring system 200 may further include a delivery unit 230 that delivers the vehicle speed information calculated by the vehicle speed calculating device 100 and/or the valid raw data to another electronic device.

The delivery unit 230 includes, for example, a UART port and an NMEA encoder. That is, the delivery unit 230 delivers the valid raw data via a serial interface by UART communication such that the valid raw data is delivered by bypassing the UART port when the valid raw data is a GPS signal and the valid raw data is converted to match the GPS signal standard by the NMEA encoder and is then delivered via the UART port when the valid raw data is a rectangular pulse signal.

The delivery unit 230 may be embodied as an independent constituent element or may be included in the vehicle speed calculating device 100.

Figure 3:
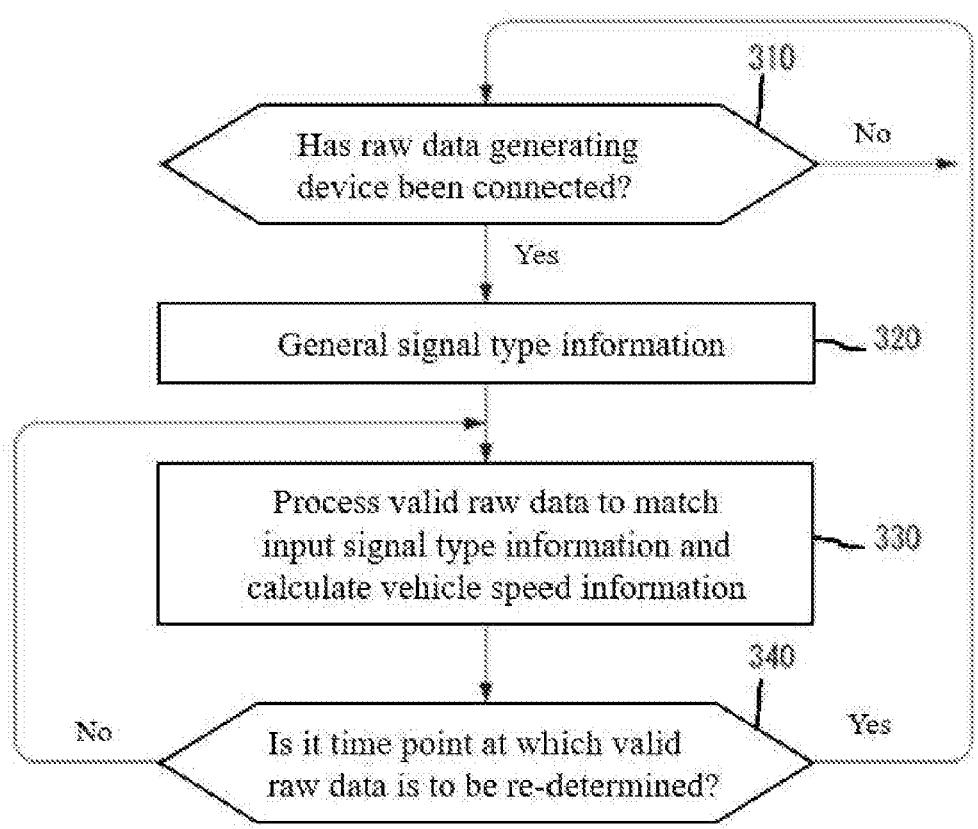
FIG. 3 is a flowchart illustrating a vehicle speed calculating method according to an embodiment of the invention.

FIG. 3 is a flowchart illustrating a vehicle speed calculating method according to an embodiment of the invention.

Referring to FIG. 3, in Step 310, the signal determining unit 116 determines whether the raw data generating device 130 which is the positioning unit 132 or the sensor 134 is connected to the input socket 105 with reference to a connection notification or a disconnection notification input from the connection detecting unit 112.

When the raw data generating device 130 is not connected to the input socket 105, the process flow stays in Step 310. On the other hand, when the raw data generating device 130 is connected to the input socket 105, the process flow transitions to Step 320.

In Step 320, the signal determining unit 116 performs a validation test on two types of raw data which are input from the input socket 105 via the UART port and the GPIO port of the signal input unit 114, determines valid raw data, and generates signal type information corresponding thereto. Subsequently, the signal determining unit 116 transmits the generated signal type information and the valid raw data to the vehicle speed calculating unit 118.

In Step 330, the vehicle speed calculating unit 118 generates vehicle speed information corresponding to a vehicle speed which is calculated by processing the input valid raw data to match the input signal type information. The procedure of receiving a GPS signal or a rectangular pulse signal as valid raw data and calculating a vehicle speed using the input valid raw data is obvious to those skilled in the art and thus description thereof will be omitted.

In Step 340, the signal determining unit 116 determines whether it is time to re-determine valid raw data from two types of raw data input via the UART port and the GPIO port of the signal input unit 114 from the input socket 105.

The signal determining unit 116 does not perform an operation of determining valid raw data whenever two types of raw data are input from the signal input unit 114, but may perform a process of determining valid raw data and generating signal type information for a predetermined unit time only when a predetermined condition is satisfied and may perform a process of inputting the raw data corresponding to the signal type information to the vehicle speed calculating unit 118 through a bypass process until the predetermined condition is satisfied again.

Here, examples of the predetermined condition include a condition that a connection notification is input again from the connection detecting unit 112 after a disconnection notification has been input and a condition that the vehicle is switched from an ignition-off state to an ignition-on state. The predetermined unit time can be set in advance to a time required for completing a validation test on one or more of two types of input raw data and generating signal type information.

When it is time to re-determine valid raw data, the process flow transitions to Step 310. On the other hand, when it is not time to re-determine valid raw data, the process flow transitions to Step 330, and the signal determining unit 116 inputs the raw data corresponding to the signal type information generated in Step 320 to the vehicle speed calculating unit 118 through a bypass process.

While the invention has been described above with reference to exemplary embodiments, it will be understood by those skilled in the art that the invention can be modified and changed in various forms without departing from the concept and scope of the invention described in the appended claims.

The invention claimed is:

1. A vehicle speed calculating device comprising:
a signal determining unit configured to receive raw data input from a raw data generating device connected to an input socket via a UART port and a GPIO port, to perform a validation test on two types of raw data received via the UART port and the GPIO port, to determine one type of raw data as valid raw data, and to output the valid raw data and signal type information generated to correspond to the valid raw data; and
a vehicle speed calculating unit configured to receive the valid raw data and the signal type information and to generate vehicle speed information corresponding to a vehicle speed which is calculated by processing the valid raw data using a predetermined processing method to match the signal type information.

2. The vehicle speed calculating device according to claim 1, wherein the raw data generating device is a positioning unit that outputs a GPS signal as raw data or a vehicle speed sensor that outputs a rectangular pulse signal as raw data.

3. The vehicle speed calculating device according to claim 2, wherein the signal determining unit performs a validation test of checking checksum in accordance with an NMEA standard on the raw data input via the UART port and performs a validation test of measuring a difference between a pulse interval and a neighboring pulse interval for a predetermined time on the raw data input via the GPIO port.

4. The vehicle speed calculating device according to claim 3, wherein the signal determining unit skips outputting of the signal type information and the valid raw data when it is determined that all the types of raw data input through the validation test on the raw data input via the UART port and the GPIO port are valid signals.

5. The vehicle speed calculating device according to claim 2, wherein the signal determining unit performs the validation test on the two types of raw data only when a predetermined conditions has been satisfied, and wherein the predetermined condition includes one or more of a condition that it is detected that the raw data generating device is disconnected from the input socket and then is connected again thereto and a condition that a vehicle is switched from an ignition-off state to an ignition-on state.

6. The vehicle speed calculating device according to claim 1, further comprising a delivery unit configured to supply the valid raw data to another electronic device, wherein the delivery unit includes:
a UART port that outputs the valid raw data to another electronic device; and
an NMEA encoder that encodes the valid raw data in a GPS signal standard and the encoded valid raw data to the UART port when the raw data received via the GPIO port is determined to be valid raw data.

7. A driver state monitoring system comprising the vehicle speed calculating device according to claim 1.

8. A driver state monitoring system comprising the vehicle speed calculating device according to claim 2.

9. A driver state monitoring system comprising the vehicle speed calculating device according to claim 3.

10. A driver state monitoring system comprising the vehicle speed calculating device according to claim 4.

11. A driver state monitoring system comprising the vehicle speed calculating device according to claim 5.

12. A driver state monitoring system comprising the vehicle speed calculating device according to claim 6.

* * * * *